(12) United States Patent
Lang et al.

(10) Patent No.: US 9,160,673 B1
(45) Date of Patent: Oct. 13, 2015

(54) LINK SELECTION IN A BONDING PROTOCOL

(71) Applicant: PMC-SIERRA US, INC., Sunnyvale, CA (US)

(72) Inventors: Tao Lang, Austin, TX (US); Avi Hagai, Raanana (IL); Nadav Busani, Mazkeret Batya (IL); Amit David, Tel-Aviv (IL)

(73) Assignee: PMC-Sierra US, Inc., Sunnyvale, CA (US)

( * ) Notice: Subject to any disclaimer, the term of this patent is extended or adjusted under 35 U.S.C. 154(b) by 130 days.

(21) Appl. No.: 13/780,733

(22) Filed: Feb. 28, 2013

(51) Int. Cl.
*H04L 12/28* (2006.01)
*H04L 12/56* (2006.01)
*H04L 12/801* (2013.01)
*H04L 12/863* (2013.01)
*H04L 12/865* (2013.01)

(52) U.S. Cl.
CPC ............ *H04L 47/29* (2013.01); *H04L 47/6225* (2013.01); *H04L 47/6255* (2013.01); *H04L 47/6265* (2013.01); *H04L 47/6275* (2013.01)

(58) Field of Classification Search
CPC ..... H04L 47/10; H04L 47/12; H04L 47/6225; H04L 47/625; H04L 47/62555; H04L 47/6265; H04L 47/6275
USPC ........... 370/235, 237, 395.21, 395.41, 395.42
See application file for complete search history.

(56) References Cited

U.S. PATENT DOCUMENTS

| | | | | |
|---|---|---|---|---|
| 5,703,618 | A * | 12/1997 | Eglit | 345/671 |
| 8,832,324 | B1 * | 9/2014 | Hodges et al. | 710/5 |
| 2005/0160171 | A1 * | 7/2005 | Rabie et al. | 709/227 |
| 2006/0013230 | A1 * | 1/2006 | Bosloy et al. | 370/395.42 |
| 2007/0058536 | A1 * | 3/2007 | Vaananen et al. | 370/230 |
| 2008/0291919 | A1 * | 11/2008 | Dunbar et al. | 370/395.3 |
| 2010/0027557 | A1 * | 2/2010 | McGarry et al. | 370/431 |
| 2012/0087372 | A1 * | 4/2012 | Narasimhan | 370/392 |
| 2012/0106567 | A1 * | 5/2012 | Hanes et al. | 370/412 |
| 2012/0275301 | A1 * | 11/2012 | Xiong | 370/230 |
| 2013/0229912 | A1 * | 9/2013 | Yu et al. | 370/228 |
| 2014/0119193 | A1 * | 5/2014 | Anand et al. | 370/237 |
| 2014/0169176 | A1 * | 6/2014 | Brock | 370/241 |
| 2014/0233566 | A1 * | 8/2014 | Flynn et al. | 370/392 |

OTHER PUBLICATIONS

Cam et al., "Inverse Multiplexing for ATM (IMA) Specification", Version 1.1, The ATM Forum Technical Committee, AF-PHY-0086. 001, Mar. 1999, 185 pages.

(Continued)

*Primary Examiner* — Farah Faroul
(74) *Attorney, Agent, or Firm* — Dennis R. Haszko (57) ABSTRACT

A method is provided for selecting a transmit link in a bonding group. Traffic is distributed to the links based on a selection method. Typical selection methods for bonded links of the same type include round robin or weighted round robin. A method is disclosed including selecting from among bonded links of different types based on link priority or link-to-group backpressure, sometimes both, and in some cases also based on traffic class. Link priority is based on the reliability, or quality, of the link. Adding link priority, and optionally traffic class, into the selection method allows high priority traffic to be always transported over high quality links. Also, considering the link-to-group backpressure, such as based on congestion status of operational links, or active links, will help avoid link congestion. The method is relevant to Quality of Service (QoS) implementation in transportation systems used for mobile backhaul or carrier access networks.

18 Claims, 4 Drawing Sheets

(56) References Cited

OTHER PUBLICATIONS

Sklower et al., "The PPP Multilink Protocol (MP)", IETF RFC1990, Network Working Group, Aug. 1996, 25 pages.

Grow et al., "IEEE Standard for Local and Metropolitan area networks—Link Aggregation", IEEE Computer Society, LAN/MAN Standards Committee, IEEE Std 802.1AX-2008, Nov. 3, 2008, USA, 163 pages.

International Telecommunications Union, "Series G: Transmission Systems and Media, Digital Systems and Networks, Digital sections and digital line system—Access networks, Ethernet-based multi-pair bonding", ITU-T Recommendation G.998.2, Jan. 2005, 18 pages.

International Telecommunications Union, "Series G: Transmission Systems and Media, Digital Systems and Networks, Digital networks—General aspects, Unified functional architecture of transport networks", Recommendation ITU-T G.800, Feb. 2012, 74 pages.

\* cited by examiner

FIG. 1

PRIOR ART

FIG. 2

PRIOR ART

LINK SELECTION IN A BONDING PROTOCOL

FIELD

The present disclosure relates generally to data transmission. More particularly, the present disclosure relates to selection of a link for data transmission in the context of a bonding group.

BACKGROUND

Figure 1:
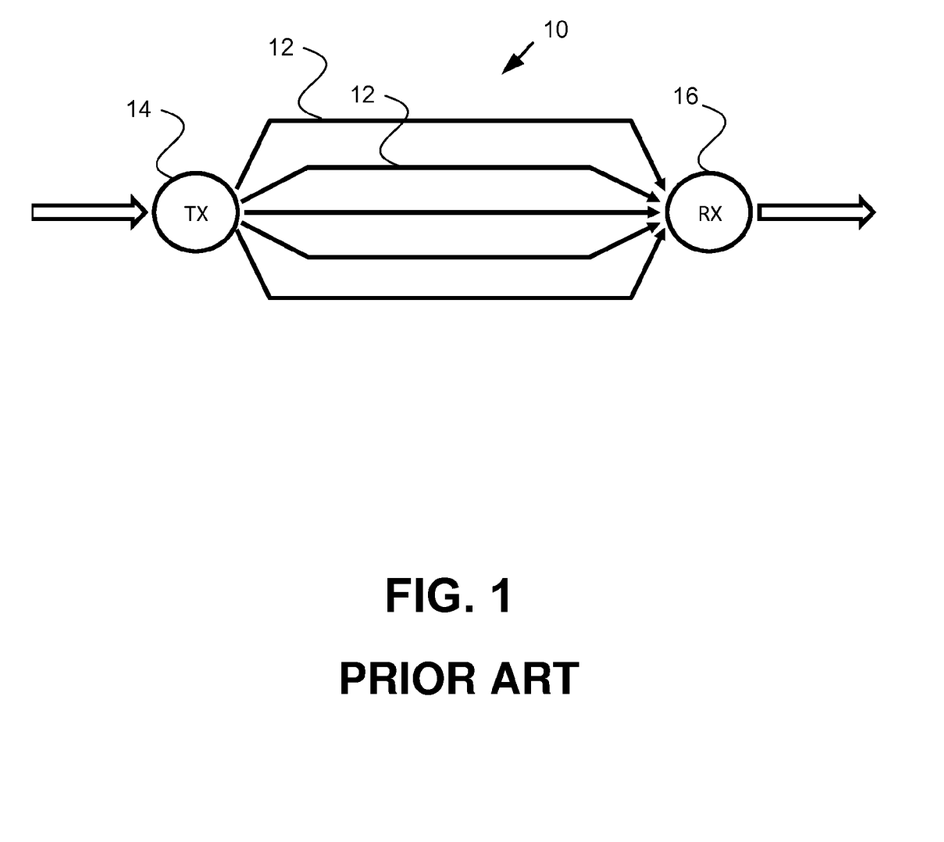
FIG. 1 illustrates the concept of link bonding.

Bonding is a popular technology that combines multiple individual links or connections into a single aggregated pipe. This process is also referred to as bundling, or inverse multiplexing. FIG. 1 is a block diagram illustrating the concept of bonding. A bonding group 10 has multiple links 12. At the transmit end 14, traffic is distributed to the links 12 based on a link selection method or algorithm. Data traffic is typically in the format of packets, fragments or frames. At the receive end 16, traffic arriving from each of the individual links is collected and reassembled.

Bonding provides two obvious benefits: 1) increasing the overall bandwidth by aggregating multiple links together; and 2) providing redundancy and protection to the overall data transfer, such that when a failed link is removed from the group, or otherwise becomes inoperative, traffic can still pass through other links.

There are many bonding protocols and standards available to date. Some examples include: inverse multiplexing of Asynchronous Transfer Mode (IMA), which is used to carry ATM over multiple time division multiplexed (TDM) links such as E1/T1; multiple link point-to-point protocol (MLPPP), which is used to carry PPP packets over multiple TDM links such as E1/T1; IEEE 802.3ad Link Aggregation (LAG), which describes the bonding of Ethernet connections; and ITU-T G.998.2, which is the bonding protocol for digital subscriber line (DSL) lines.

Existing bonding protocols have three common characteristics. The first common characteristic is that they only consider the same type of links in a bonding group, i.e. the links in the group are homogeneous. One example of this homogeneity is being of the same link type, meaning that the links are comprised of the same physical medium and thus have the same data transfer characteristic. For example, IMA and MLPPP deal with TDM (e.g. E1/T1) links only. LAG is for Ethernet (Gigabit Ethernet or Fast Ethernet) links only. G.998.2 only works on ADSL or VDSL links.

Because the links are of the same type, it both implies and assumes that all links are equal in terms of quality, reliability and priority. The only difference among links is the speed. IMA and MLPPP protocols allow the links to have different speed. Consequently, when data (e.g. a packet) arrives at the transmit end of the bonding group, the decision of which link should be selected to transport this data is relatively simple. Since all the links in the bonding group are of the same quality, a protocol that simply selects the next available link is sufficient to ensure the benefits of bonding are applied to the data transfer. The simplest examples of this are known as Round Robin (RR) link selection and Weighted Round Robin (WRR) link selection.

The second common characteristic of existing bonding protocols is, because of the first characteristic, the link selection algorithms are typically implemented as either round robin or weighted round robin. The RR algorithm always selects the next link in the group, and cycles through the links one by one. The WRR algorithm cycles through the links in the same fashion as RR; however, once a link is selected, it will transmit more than one packet or fragment. The amount of data allowed is proportional to the weight. In weighted round robin, each link has a weight attribute (representing the link speed) that is considered in link selection.

The third common characteristic of existing bonding protocols is that link speed is considered as static. The link speed does not change once a link is added to the group.

Figure 2:
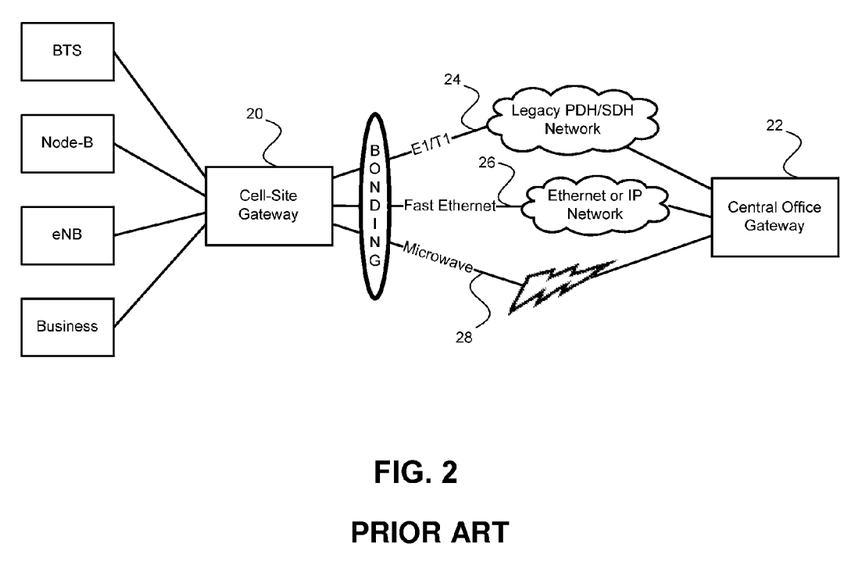
FIG. 2 illustrates bonding in mobile backhaul.

The above characteristics of known approaches become a serious limitation for newer applications, unable to meet the requirements of mobile backhaul or other transport applications. FIG. 2 illustrates an example of bonding in mobile backhaul.

Mobile backhaul is a way to transport base-station traffic from a cell site 20 to a central office 22. E1/T1 links 24 are widely used for 2G/3G backhaul. With the fast growing of data rate, E1/T1 bandwidth becomes insufficient. Carriers are adding Ethernet links 26 (copper or fiber) to the cell site, or a microwave link 28 in case cabling is prohibited, in addition to the already existing TDM links. The result is that different types of physical medium (E1/T1, DSL, active Ethernet, microwave etc.) may co-exist at the cell site.

Telecommunications are starting to bond links of different types together, such as in the example of mobile backhaul in FIG. 2. For example a copper link, which is a very reliable medium for data transfer, may be put in the same bonding group as an RF link, which is a much less reliable medium for data transfer. To ensure that the overall data transfer is protected, the method used to select the next link cannot just be a random selection of the next available link, as is the case in existing bonding protocols.

It is desirable to provide link selection in a bonding protocol that addresses at least one of the shortcomings of existing approaches.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method for selecting a transmit link in a bonding group. A bonding group comprises multiple links. Traffic is distributed to the links based on a selection method. Typical selection methods for bonded links of the same type include round robin or weighted round robin. The present disclosure describes a method to select from among bonded links of different types based on link priority or link-to-group backpressure, sometimes both, and in some cases also based on traffic class. Link priority is based on the reliability, or quality, of the link. Adding link priority, and optionally traffic class, into the selection method allows high priority traffic to be always transported over high quality links. Also, considering the link-to-group backpressure, such as based on link congestion status of active or operational links, will help avoid link congestion. The method is relevant to Quality of Service (QoS) implementation in transportation systems used for mobile backhaul or carrier access networks.

In an embodiment, the present disclosure provides a link selection method for bonded data transmission links, comprising: determining a link priority for first and second links among the bonded transmission links, the first and second links being of different link types in the same bonding group, the determined link priority being detected based on a link congestion status and being based on a data transmission reliability of the link; detecting a link-to-group backpressure of the first and second links, the link-to-group backpressure being based on the availability of an operational link to accept additional data; and selecting the next link to be used for data transmission based on the determined link priorities and the detected link-to-group backpressures.

In an example embodiment, the link congestion status of a selected link is determined based on a detected fill level in a first in first out (FIFO) memory provided in the selected link, the selected link being selected from the first and second links.

In an example embodiment, the link priority is determined relative to other links in the bonding group, or is determined based on link quality independent of link speed, or both.

In an example embodiment, the data transmission reliability is determined relative to other links in the bonding group, or is determined based on link quality, or both.

In an example embodiment, the method further comprises assigning link priority as a link is added to the bonding group.

In an example embodiment, the method further comprises modifying the determined link priority during operation. In an example embodiment, the determined link priority is modified in response to a change in a reliability-related characteristic of the link.

In an example embodiment, the method further comprises: determining a traffic class of the data to be transmitted; and selecting the next link to be used for data transmission based on the determined link priorities, the detected link-to-group backpressures and the determined traffic class. In an example embodiment, selecting the next link based on the determined traffic class is based on whether the determined traffic class is permitted on one or more of the bonded transmission links.

In an example embodiment, the second link has a different data transfer characteristic than the first link, or the second link is a different physical medium than the first link.

In a further embodiment, the present disclosure provides a link selection method for bonded data transmission links, comprising: detecting a link-to-group backpressure of each of the bonded transmission links, at least some of the bonded transmission links being of different link types in the same bonding group, the link-to-group backpressure being detected based on a link congestion status and being based on the availability of an operational link to accept additional data; and selecting the next link to be used for data transmission based on the detected link-to-group backpressures. In an example embodiment, selecting the next link comprises selecting the next non-congested link in a round robin fashion. In an example embodiment, the method further comprises: determining a traffic class of the data to be transmitted; and selecting the next link to be used for data transmission based on the detected link-to-group backpressures and the determined traffic class.

In an example embodiment, the link congestion status of a selected link is determined based on a detected fill level in a first in first out (FIFO) memory provided in the selected link, the selected link being selected from the first and second links.

In an embodiment, the present disclosure provides a computer-readable storage device storing statements and instructions for execution by a processor to perform a link selection method for bonded transmission links, the method comprising: determining a link priority for first and second links among the bonded transmission links, the first and second links being of different link types in the same bonding group, the determined link priority being based on a data transmission reliability of the link; detecting a link-to-group backpressure of the first and second links, the link-to-group backpressure being detected based on a link congestion status and being based on the availability of an operational link to accept additional data; and selecting the next link to be used for data transmission based on the determined link priorities and the detected link-to-group backpressures.

In an example embodiment, the link congestion status of a selected link is determined based on a detected fill level in a first in first out (FIFO) memory provided in the selected link, the selected link being selected from the first and second links.

Other aspects and features of the present disclosure will become apparent to those ordinarily skilled in the art upon review of the following description of specific embodiments in conjunction with the accompanying figures.

In mobile backhaul applications, it is natural for carriers to bond all available links together to maximize the backhaul bandwidth. Requirements for such bonding in mobile backhaul applications differ from the existing or known bonding protocols in the following ways:

1. Links in the desired bonding group are heterogeneous. They can be different medium, different rate, and different quality of service. For example, an E1 link offers higher quality than a microwave link due to its higher reliability and lower latency.

2. Because of (1), it is desirable to distribute the traffic based on link quality. High quality links should be used as much as possible. In an example embodiment, only when the high quality links are fully utilized, next quality links should be considered. It is also desirable to reserve high quality links for high class traffic, and direct low class traffic to low quality links only.

3. Link rate may change dynamically. A good example is microwave link, whose bandwidth is affected by weather conditions. Such real-time change of the link rate should be sensed by the bonding group through a link-to-group back pressure and be taken into consideration in the link selection.

In summary, latest applications in mobile backhaul present new challenges for bonding operation, such as heterogeneous links and link rate modification. Such characteristics are not supported or properly addressed by existing bonding protocols.

Because reliability is a desirable characteristic in a link, it can be said that those links which provide a reliable medium for data transfer provide high quality service and those that provide an unreliable medium for data transfer provide a low quality of service. Thus, links which provide different quality of service are being grouped together. This form of link bonding can be referred to as heterogeneous bonding.

In an example embodiment, in this new type of heterogeneous bonding operation, the next link is selected based on the quality or reliability of the link. A copper transmission link, for example, is considered very reliable. Once the speed of a copper link is set, it is considered to never change. Furthermore, the data loss rate is also considered almost zero. Unless someone cuts the cable, one does not expect to have any data loss or bit error. A radio signal on the other hand has a very different transfer characteristic. The bandwidth of these types of links is known to change very dynamically. If the weather changes, for example, it can cause the bandwidth of the signal to change very suddenly resulting in a dropped throughput. Thus, an element that captures not only the link speed but also the link quality is needed to ensure the ability of the bonding protocol to provide QoS, that is, best service to the most important data.

For example if we determine that a copper link has a higher quality than an RF link, then we want to select the copper link as much as possible. In an embodiment, only when the high quality links are fully utilized, do we use the low quality links. This calls for a method that is different from those utilized in known bonding protocols.

Figure 3:
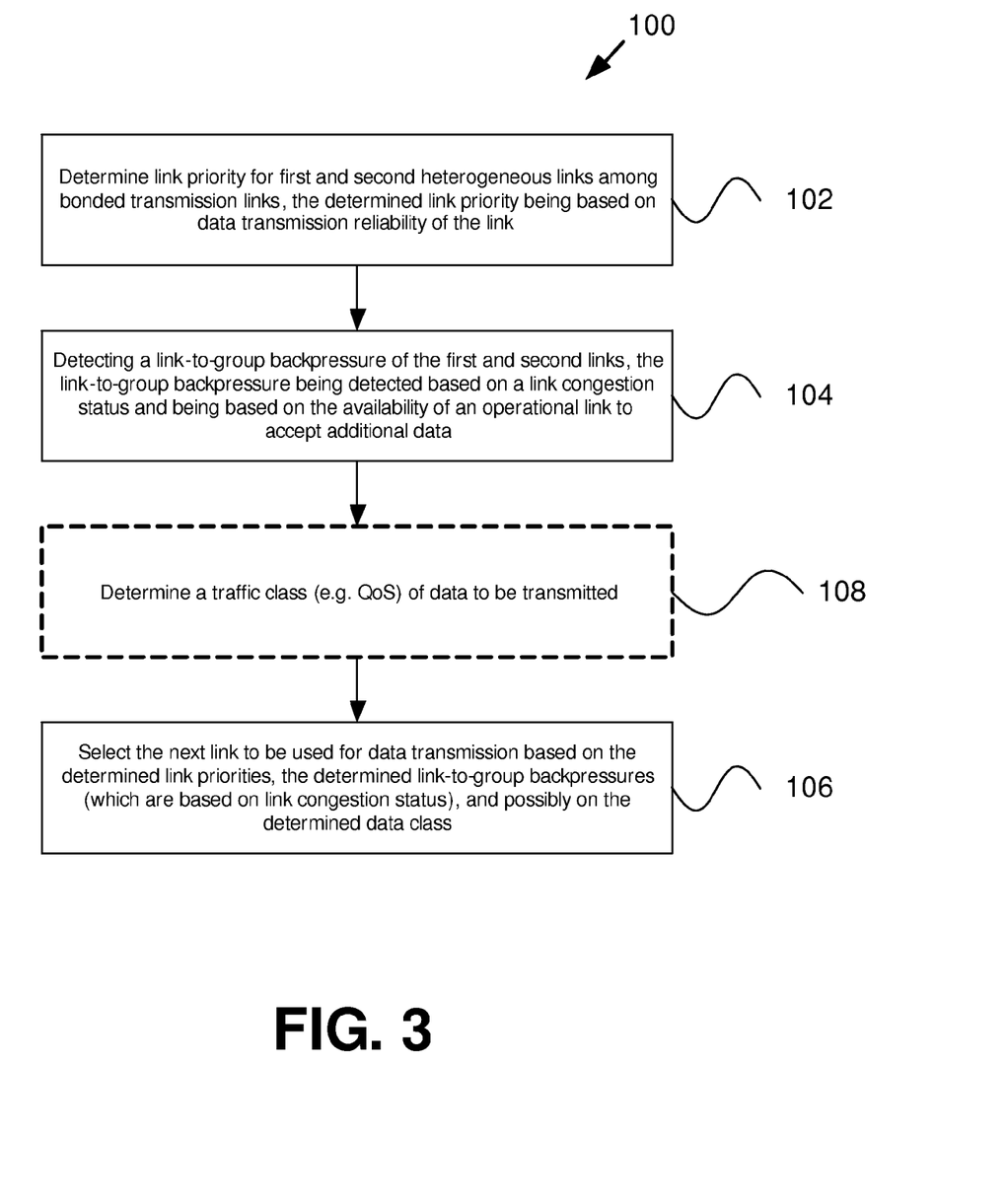
FIG. 3 illustrates a method of link selection in a bonding protocol according to an embodiment of the present disclosure.

FIG. 3 illustrates a method 100 of link selection in a bonding protocol according to an embodiment of the present disclosure. In step 102, a link priority, or link quality, is determined for first and second heterogeneous links among the bonded transmission links. In an embodiment, the first and second links are of different link types in the same bonding group. In an example embodiment, the second link has a different data transfer characteristic than the first link. In an example embodiment, the second link is a different physical medium than the first link. In an example embodiment with a plurality of links, at least some of which are heterogeneous or have different transfer characteristics, a link priority is determined for each of the plurality of links.

In step 102, the determined link priority, or link quality, is based on the data transmission reliability of the link. In other embodiments, the determined link priority can additionally be based on other factors.

In an example embodiment, the link priority is determined in step 102 relative to other links in the bonding group. For example, the links may include fiber optic cables, DSL etc. A fiber link may have a higher priority number than other types of links that are contained in within the group. In an example embodiment, link priority values are set relative to values for the other links within the same bonding group. The link priority value can be determined based on known or pre-defined relative link transfer characteristics, and can be assigned automatically based on detection of link type, or manually by an operator.

In an example embodiment, a data transmission reliability, upon which link priority is based, is determined relative to other links in the bonding group. In an example embodiment, the data transmission reliability is determined based on link quality.

In an example embodiment, the link priority is determined in step 102 based on link quality independent of link speed. In another implementation, for example when two particular links are of the same type, speed is one of the factors considered in determining the relative link priority.

Consider the embodiment in which link priority is based on link quality independent of link speed. In the known weighted round robin (WRR) algorithm, the weighting represents the relative speed of link elements. So, in WRR the links with the higher weighting will get more traffic and the links with the lower weighting will get less traffic. This is very different from link priority in an embodiment of the present disclosure, which is based on link reliability and quality, and in example embodiments is completely independent of speed. While WRR seeks to select a link based on link speed, embodiments of the present disclosure seek to select a link based on the ability of the link to deliver the data, regardless of the speed of that link.

Existing approaches, such as WRR, have only been concerned with situations that bond links of the same type. In other words, existing technology is concerned with generating algorithms for bonded links that have the same ability to deliver the data—thus the only difference between the links is that one of the links may be higher speed than the other links. Thus existing technology need only differentiate the links based on their transfer rate.

In contrast, the link priority in embodiments of the present disclosure is a comprehensive score of the link. The link priority does not have to include the speed. In an example embodiment, if the link has a high priority rating, it isn't necessarily faster than any other link—in fact it may be the slowest link in the group. In example embodiment, copper may have the lowest transfer rate relative to the other types of link in the bonding group, yet it may be the most reliable thus it will receive the highest priority rating. In an example embodiment, only when a reliable type of link is full are other links utilized. So it is possible that the highest priority link may become the lowest speed link in the group.

Embodiments of the present disclosure base link selection on the ability of the link to guarantee the data delivery. In contrast, the weighted round robin algorithm is based only on the speed at which the link will transfer the data, and does not consider whether or not the delivery can actually be made.

In an example embodiment, link priority is a user defined attribute reflecting the quality or class of the link. In an example embodiment, each link has a link priority when being added to the bonding group. A method according to an example embodiment includes assigning a link priority to a link as the link is added to the bonding group. The link priority may be changed during operation. A method according to an example embodiment includes modifying, or changing, the link priority during operation, for example in response to a change in a reliability-related characteristic of the link.

Referring back to FIG. 3, in step 104, a link-to-group backpressure, or link backpressure, is detected for the first and second links. Link-to-group backpressure refers to the ability of a link to inform a group to which it belongs when that link is not able to take more data. In the example embodiment of FIG. 3, to be described in further detail below, link-to-group backpressure is implemented based on a detected link congestion status.

In an embodiment, the link-to-group backpressure detected in step 104 is determined based on the ability of the link to accept data independent of the status of any other links in the bonding group, such as based on a determined link congestion status. For example, the determined link congestion status can be based on the availability of an operational link, or active link, to accept additional data. This is in contrast to the concept of a link status in known approaches, which only indicates whether a link is active or inactive without providing an indication of the congestion thereof or ability to accept additional data. In an example embodiment, adding such link congestion status to the link selection method enables the backpressure from the link to the group, meaning that a link can stop taking more data from the group when its bandwidth is insufficient.

In an example embodiment, the link congestion status of a selected link is determined based on a detected fill level in a first in first out (FIFO) memory provided in the selected link. For example, in one implementation, each link has a small FIFO with a watermark that indicates when the FIFO is "full". When data is sent to the link, the data is first placed into the FIFO. Data is then taken out of the FIFO based on the link speed. If an operational link is available, the data will go from the FIFO to the link. If an operational link is unavailable, the data will stay in the FIFO. Two watermarks can be used on the FIFO to indicate a level with respect to which the link congestion status is determined. When the FIFO fill level exceeds the first watermark, the link is considered congested and the congestion status is set. Whenever the FIFO fill level is below the second watermark, the congestion status is cleared. Additional link congestion status can optionally be generated and reported to the group when the fill level falls in between the two watermarks. In an example embodiment, the FIFO is part of the link. A bonding group can then use the congestion status as indication whether the link cannot take any more data.

Most existing approaches are only concerned with a fixed bandwidth. Thus they are only interested with knowing when a link is up or down, i.e. operational or non-operational. In most existing approaches, the status of a link is monitored only to set off an alarm indicating a broken link when a link goes down. This does not allow such approaches to monitor any changes in the bandwidth. A method according to an embodiment of the present disclosure, on the other hand, allows a true backpressure from the link to the group. Such backpressure can be the result of the change in the bandwidth.

In existing approaches, the status signal is only used to determine when a link is going completely down (link down) or whether it is fully operational (link up). Furthermore, monitoring whether a link is down or up is not used to decide which link to select, but is only used to determine whether to delete the link from the bonding group. In a method according to an embodiment of the present disclosure, the link-to-group backpressure, which can be based on link congestion status, is used to determine the ability of the link to take data, independent to the status of any other link in the bonding group. This is in contrast to existing approaches, which only utilize the link status to determine whether the link should remain in the link bonding group. According to embodiments of the present disclosure, the link-to-group backpressure is used as part of the link selection method, regardless of how the backpressure is generated and in what format. For example, multi-level link status can be used in which a selection method responds to an intermediate status by slowing down, but not completely disallowing, the selection of a link. The previously-described embodiment including two watermarks supports a three level status, with use of the third level being optional.

As mentioned earlier, another improvement according to embodiments of the present disclosure, compared to weighted round robin, is that it is not necessary to know the speed of the link. Once the link congestion status is known, it is not necessary to know the actual speed of the link, and in many cases the speed is irrelevant. A link selection decision in an example embodiment is based on the link priority and the link status. This is an improvement over conventional technologies because the link speed need not be monitored. For example, in the case of radio or microwave links, the actual transfer rate changes dynamically based on weather conditions; so, a method that does not require monitoring of the actual transfer speed is preferable.

Referring back to FIG. 3, in step 106 the next link to be used for data transmission is selected based on the determined link priorities and the detected link-to-group backpressures. In known approaches, neither the link priority/quality nor the link-to-group backpressure is determined or detected; also, neither of these values is used to perform a method of link selection in a group of bonded transmission links. In known approaches using homogeneous links, link quality is not determined, since homogeneous links are assumed to have the same quality or reliability. Similarly, link-to-group backpressure is not detected in known approaches, since the fact that a homogeneous link is active has typically been the only information of interest.

In optional step 108 of FIG. 3, a traffic class, or data class, is determined with respect to the data to be transmitted. This step can also be performed if only one of the link priority or link congestion status is determined, as discussed in the above example embodiments. Determining the traffic class can comprise determining a traffic priority, or determining a quality of service (QoS), for the data. Considering both link priority and traffic class as part of a link selection method according to an embodiment of the present disclosure allows high priority traffic to be always transported over high quality links.

In an example embodiment, the link selection method comprises: determining a traffic class of the data to be transmitted; and selecting the next link to be used for data transmission based on the determined traffic class and either or both of the determined link priorities and the detected link-to-group backpressures. In another example embodiment, selecting the next link based on the determined traffic class is based on whether the determined traffic class is permitted on one or more of the bonded transmission links.

The inclusion of the traffic class in the method of link selection according to an embodiment of the present disclosure permits flexibility in creating an over-arching generalized method that includes such embodiments, but can also be modified to implement round robin, weighted round robin, and other selection methods by fixing certain values. This provides an advantage of having the benefits of the enhanced functionality of embodiments of the present disclosure, while also providing backwards-compatibility to also implement known approaches.

When a bonding group has some data (whether it is a whole packet or a fragment of packet) to transmit, it consults a link selection method to determine which link the data will be forwarded to. The method examines all links in the group, and makes the decision based on some pre-set criteria. Consider an approach in which the following three parameters are considered in link selection in bonding protocols: (1) Link Priority; (2) Traffic Class; and (3) Link Congestion Status as the result of link-to-group backpressure.

In an example implementation, all three of these elements are considered together to determine which link should be selected. The result is that the high priority traffic goes to the high quality link first. When all the high quality links are utilized, which is determined by detecting the link congestion status, traffic is directed to the low quality links. If one or more of these three parameters is fixed, the over-arching generalized method can be modified to implement, or emulate, different types of link selection methods as shown in Table 1 below. In Table 1 "Fixed" means the parameter is ignored or not considered in the selection process. "UnFixed" means the parameter will be taken into consideration.

TABLE 1

| Element | Round Robin Emulation | Weighted Round Robin Emulation | Strict Priority Emulation | Embodiments of Present Disclosure |
|---|---|---|---|---|
| Link Priority | Fixed/ Ignored | Unfixed/ Considered | Unfixed/ Considered | Unfixed/ Considered |
| Traffic Class | Fixed/ Ignored | Fixed/ Ignored | Fixed/ Ignored | Unfixed/ Considered |
| Link Congestion Status | Fixed/ Ignored | Fixed/ Ignored | Unfixed/ Considered | Unfixed/ Considered |

Consider the following data, which could be a whole packet or fragment of packet, arriving at the bonding group in order: ..., $D_{x-2}$, $D_{x-1}$, $D_x$, .... An embodiment of the present disclosure can be expressed as:

Link($D_x$)=func[Class($D_x$), Pri(link1), Pri(link2), ..., Pri(linkN),
  Status(link1), Status(link2), ..., Status(linkN)]
where
Link($D_x$) is the link selected for data $D_x$.
func[ ] is the selection function or method.
Class($D_x$) is the class of the data, or traffic class; this number represents the class of service (CoS) for data $D_x$.
Pri(link) is the priority of the link; this number is assigned based on the overall link quality and reliability, with links denoted as link1, link 2, ..., linkN.
Status(link) is the link-to-group backpressure result indicated by link congestion status; the status is either OK (1) or CONGESTED (0).

In an embodiment, for selection of a link the method considers (a) the CoS of the data itself; (b) the priority of all links and (c) the congestion status of all links.

The method can be implemented in various ways depending on the usage of the arguments in func[ ].

RR
Let Class($D_x$) be fixed at 0, Pri(link)=0, Status(link)=OK.
Link($D_x$)=func[ ]=Link($D_{x-1}$)+1
This emulates the round robin algorithm.
WRR
Let Class($D_x$) be fixed at 0, Status(link)=OK.
Let Pri(link) be the weight or speed of the link.
Link($D_X$)=func[Pri(link1), Pri(link2), ..., Pri(linkN)]
=func[weight(link1), weight(link2), ..., weight(linkN)]
This emulates the WRR algorithm.
Strict Priority
Let Class($D_X$) be fixed at 0.
Link($D_X$)=func[Pri(link1), Pri(link2), ..., Pri(linkN),
    Status(link1), Status(link2), ..., Status(linkN)]
=max(Pri(link1) & Status(link1),
Pri(link2) & Status(link2),
...,
Pri(linkN) & Status(linkN))
In this implementation, data is forwarded to links based on strict priority. Only when all higher priority links are CONGESTED, a low priority link will be selected.
Class Based Mapping In an example embodiment, a mapping table is defined, such as by an operator, to allow/disallow certain class of data to be carried by certain links. For example, T[CoS][link] is a mapping table with two dimensions. T[x][y]=1 means data of CoS=x is allowed to be forwarded to link y. 0 means CoS=x is not allowed on link y.

Link($D_X$)=func[Class($D_x$), Pri(link1), Pri(link2), ..., Pri(linkN),
  Status(link1), Status(link2), ..., Status(linkN)]
=max(Pri(link1) & Status(link1) & T[Class(Dx)][link1],
Pri(link2) & Status(link2) & T[Class(Dx)][link2],
...,
Pri(linkN) & Status(linkN) & T[Class(Dx)][linkN],)

In this example, high CoS data will not be forwarded to certain low priority links in order to guarantee the latency. Low CoS data will not be forwarded to certain high priority links to avoid congestion. The result is that high CoS data gets some reserved links or bandwidth that won't be shared by low CoS data, and that certain low quality poor links are only used to transport low CoS data. This method fully satisfies the requirements of heterogeneous bonding operation in mobile backhaul application. In an example embodiment, such a method step is based on a mapping table that establishes a one-to-one setting (e.g. allowed or disallowed) between CoS and link.

Quality of Service is essential in many telecommunications implementations. To date, there is little connection between QoS and bonding protocol. Embodiments of the present disclosure establish a novel connection between CoS of the data and the bonding links, and add a new dimension to link selection in the context of a bonding protocol. Such an implementation can be applicable not only to new bonding protocols, but also to any existing bonding protocols.

In an example embodiment, a Strict Priority version of the method has been implemented using Win Path Data Path Software (DPS) language release WDDS 4.2.2. The feature is called Virtual Bonding. Developing Virtual Bonding on WinPath3 network processor and its software, a user is able to create bonding group, and add links to the group with different priority. In this example, when there is data to be transmitted, a non-congested link with highest priority will be selected. In this example, a link is deemed as congested when the data in the link's FIFO (each link has its own FIFO) has exceeded certain threshold.

The example embodiment of FIG. 3 describes the use of both link priority and link-to-group backpressure. In other example embodiments, only one of these two determinations or detections is used to provide a link selection method for heterogeneous links in a bonding group.

In an embodiment, a link selection method for bonded data transmission links comprises: determining a link priority of each of the bonded transmission links, at least some of the bonded transmission links being of different link types in the same bonding group, the determined link priority being based on data transmission rate; and selecting the next link to be used for data transmission based on the determined link priorities. In this embodiment in which link priority is considered, without explicitly considering link-to-group backpressure or traffic class, the link priority is based on data transmission rate, since the link priority represents link speed or "weight" in order for weighted round robin between the links to become possible. In an example embodiment, a method according to an embodiment of the present disclosure falls back to a conventional WRR.

In another embodiment, a link selection method for bonded data transmission links, comprises: detecting a link-to-group backpressure of each of the bonded transmission links, at least some of the bonded transmission links being of different link types in the same bonding group, the detected link-to-group backpressure being based on the availability of an operational link to accept additional data; and selecting the next link to be used for data transmission based on the detected link-to-group backpressures. In an example embodiment, selecting the next link comprises selecting the next non-congested link in a round robin fashion.

Referring back to FIG. 3, in an embodiment, the present disclosure provides a link selection method for bonded data transmission links, comprising: determining a link priority for first and second links among the bonded transmission links, the first and second links being of different link types in the same bonding group, the determined link priority being based on a data transmission reliability of the link; determining a link congestion status of the first and second links, the determined link congestion status being based on the relative availability of an operational link to accept additional data; and selecting the next link to be used for data transmission based on the determined link priorities and the determined link congestion statuses.

In another embodiment, the present disclosure provides a link selection method for bonded data transmission links, comprising: determining a link congestion status of each of the bonded transmission links, at least some of the bonded transmission links being of different link types in the same bonding group, the determined link congestion status being based on the relative availability of an operational link to accept additional data; and selecting the next link to be used for data transmission based on the determined link congestion statuses.

In a further embodiment, the present disclosure provides a non-transitory machine-readable medium storing statements and instructions for execution by a processor to perform a link selection method for bonded transmission links, the method comprising: determining a link priority for first and second links among the bonded transmission links, the first and second links being of different link types in the same bonding group, the determined link priority being based on a data transmission reliability of the link; determining a link congestion status of the first and second links, the determined link congestion status being based on the relative availability of an operational link to accept additional data; and selecting the next link to be used for data transmission based on the determined link priorities and the determined link congestion statuses.

Figure 4:
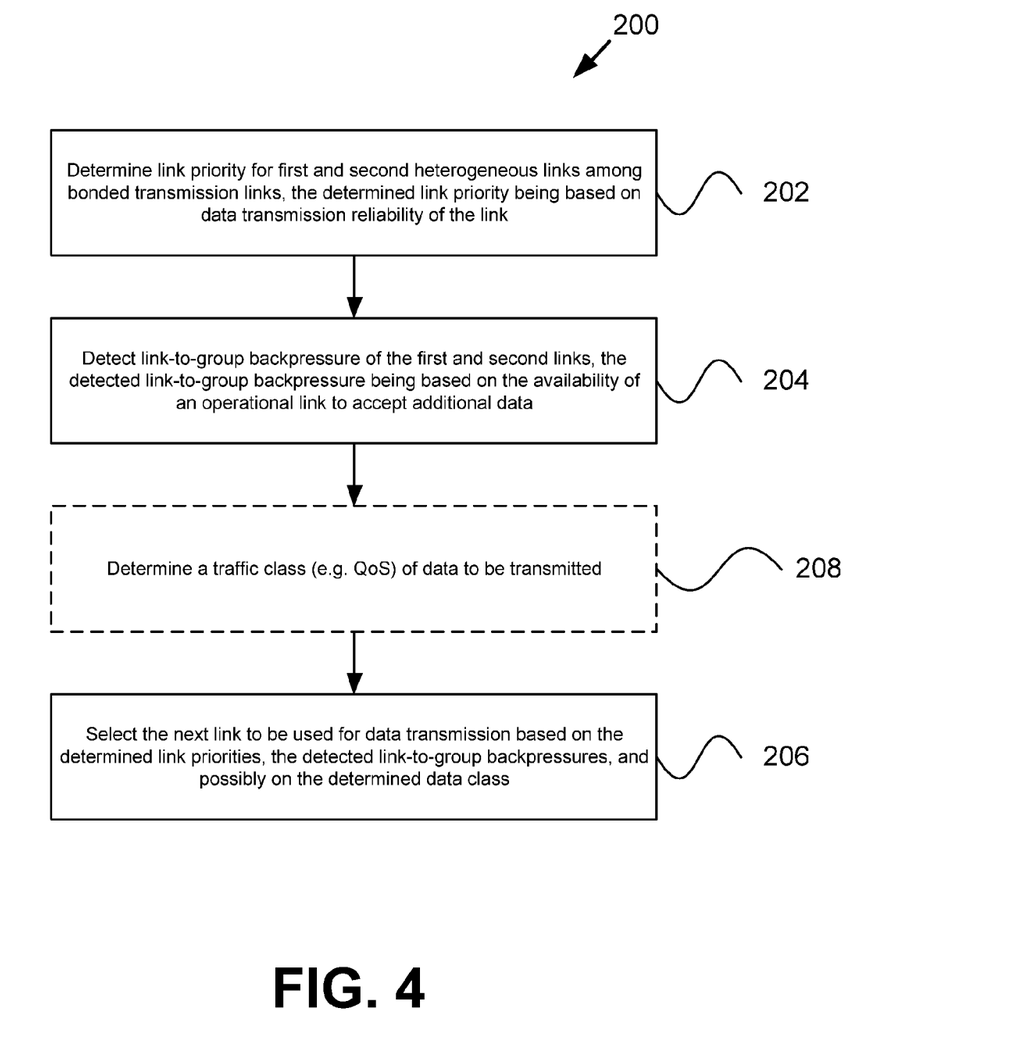
FIG. 4 illustrates a method of link selection in a bonding protocol according to another embodiment of the present disclosure.

FIG. 4 illustrates a method of link selection in a bonding protocol according to another embodiment of the present disclosure. Link-to-group backpressure refers to the ability of a link to inform a group to which it belongs when that link is not able to take more data. While the embodiment of FIG. 3 related specifically to detecting link-to-group backpressure based on a detected link congestion status, there are other ways to implement backpressure. In another example embodiment, link-to-group backpressure is implemented by having the link send a pause command to the group requesting the group to stop selecting this link for a period of time.

The method 200 of FIG. 4 is similar to the method 100 of FIG. 3. In particular, steps 202 and 208 are substantially the same as steps 102 and 108. In step 204, when compared to step 104, the detected link-to-group backpressure is based on the availability of an operational link to accept additional data, but is either not necessarily based on link congestion status, or is not based on link congestion status. Step 206 is similar to step 106, but the link selection is based on the detected link-to-group backpressures from step 204.

In an embodiment, the present disclosure provides a link selection method for bonded data transmission links, comprising: determining a link priority for first and second links among the bonded transmission links, the first and second links being of different link types in the same bonding group, the determined link priority being based on a data transmission reliability of the link; detecting a link-to-group backpressure of the first and second links, the link-to-group backpressure being based on the availability of an operational link to accept additional data; and selecting the next link to be used for data transmission based on the determined link priorities and the detected link-to-group backpressures.

In an example embodiment, the link priority is determined relative to other links in the bonding group, or is determined based on link quality independent of link speed, or both.

In an example embodiment, the data transmission reliability is determined relative to other links in the bonding group, or is determined based on link quality, or both.

In an example embodiment, the method further comprises assigning link priority as a link is added to the bonding group.

In an example embodiment, the method further comprises modifying the determined link priority during operation. In an example embodiment, the determined link priority is modified in response to a change in a reliability-related characteristic of the link.

In an example embodiment, the link-to-group backpressure for a selected link is detected based on a link congestion status. In an example embodiment, the link congestion status of the selected link is determined based on a detected fill level in a first in first out (FIFO) memory provided in the selected link.

In an example embodiment, the method further comprises: determining a traffic class of the data to be transmitted; and selecting the next link to be used for data transmission based on the determined link priorities, the detected link-to-group backpressures and the determined traffic class. In an example embodiment, selecting the next link based on the determined traffic class is based on whether the determined traffic class is permitted on one or more of the bonded transmission links.

In an example embodiment, the second link has a different data transfer characteristic than the first link, or the second link is a different physical medium than the first link.

In another embodiment, the present disclosure provides a link selection method for bonded data transmission links, comprising: determining a link priority of each of the bonded transmission links, at least some of the bonded transmission links being of different link types in the same bonding group, the determined link priority being based on data transmission reliability; and selecting the next link to be used for data transmission based on the determined link priorities. In an example embodiment, the method further comprises: determining a traffic class of the data to be transmitted; and selecting the next link to be used for data transmission based on the determined link priorities and the determined traffic class.

In a further embodiment, the present disclosure provides a link selection method for bonded data transmission links, comprising: detecting a link-to-group backpressure of each of the bonded transmission links, at least some of the bonded transmission links being of different link types in the same bonding group, the detected link-to-group backpressure being based on the availability of an operational link to accept additional data; and selecting the next link to be used for data transmission based on the detected link-to-group backpressures. In an example embodiment, selecting the next link comprises selecting the next non-congested link in a round robin fashion. In an example embodiment, the method further comprises: determining a traffic class of the data to be transmitted; and selecting the next link to be used for data transmission based on the detected link-to-group backpressures and the determined traffic class.

In an embodiment, the present disclosure provides a computer-readable storage device storing statements and instructions for execution by a processor to perform a link selection method for bonded transmission links, the method comprising: determining a link priority for first and second links among the bonded transmission links, the first and second links being of different link types in the same bonding group, the determined link priority being based on a data transmission reliability of the link; detecting a link-to-group backpressure of the first and second links, the detected link-to-group backpressure being based on the availability of an operational link to accept additional data; and selecting the next link to be used for data transmission based on the determined link priorities and the detected link-to-group backpressures.

Embodiments of the present disclosure are applicable to any bonding protocol, and are needed for new bonding protocols with heterogeneous operations. Such embodiments are also applicable to existing bonding protocols as a feature improvement.

Embodiments of the present disclosure allow a bonding protocol to operate in heterogeneous mode where each link can be different type or quality. This solves a practical issue in mobile backhaul application where heterogeneous links may co-exist and need to be bonded together. Carriers will find such method extremely welcoming.

Embodiments of the present disclosure include one or more of: CoS, link priority and link-to-group backpressure into a link selection method. This helps carriers develop more advanced QoS on top of bonding protocols. The actual implementation of the method is flexible, and can be as simple as compatible to existing RR/WRR, or as complicated as class based link selection.

Embodiments of the present disclosure provide an implementation of link selection based on link-to-group backpressure. An example embodiment of link-to-group backpressure includes a per-link FIFO and the detection of link congestion status by comparing of FIFO fill level against certain watermarks. In an example embodiment, link to group backpressure is indicated based on the link congestion status.

Other aspects and features of the present disclosure will become apparent to those ordinarily skilled in the art upon review of the following description of specific embodiments in conjunction with the accompanying figures.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A link selection method for bonded data transmission links, comprising:
    determining a link priority for first and second links in a bonding group comprising the bonded data transmission links, the first and second links being of different link types, the determined link priority for first and second links being based on a data transmission reliability of the first and second links, respectively;
    detecting a link-to-group backpressure of the first and second links, the link-to-group backpressure of the first link being detected based on a first link congestion status of the first link that indicates the availability of the first link to accept additional data, and the link-to-group backpressure of the second link being detected based on a second link congestion status of the second link that indicates the availability of the second link to accept additional data; and
    selecting one of the first and second links as a next link to be used for data transmission based on the determined link priorities and the detected link-to-group backpressures of the first and second links,
    wherein the first link congestion status indicates that the first link is unavailable to accept additional data when a detected fill level in a first first-in-first-out (FIFO) memory provided in the first link exceeds a first watermark of the first FIFO and wherein the first link congestion status indicates that the first link is available to accept additional data when the detected fill level in the first FIFO is below a second watermark of the first FIFO.

2. The method of claim 1 wherein the link priority for first and second links is determined relative to other links in the bonding group.

3. The method of claim 1 wherein the data transmission reliability for first and second links is determined relative to other links in the bonding group.

4. The method of claim 1 wherein the data transmission reliability of the first and second links is determined based on link quality of the first and second links, respectively.

5. The method of claim 1 wherein the link priority for first and second links is determined based on link quality of the first and second links, respectively, independent of link speed.

6. The method of claim 1 further comprising assigning link priority as a link is added to the bonding group.

7. The method of claim 1 further comprising modifying the determined link priority for first and second links during operation.

8. The method of claim 7 wherein the determined link priority for at least one of the first and second links is modified in response to a change in a reliability-related characteristic of the at least one of the first and second links.

9. The method of claim 1 further comprising:
    determining a traffic class of the data to be transmitted; and
    selecting one of the first and second links as the next link to be used for data transmission based on the determined link priorities, the detected link-to-group backpressures and the determined traffic class.

10. The method of claim 9 wherein selecting one of the first and second links as the next link based on the determined traffic class is based on whether the determined traffic class is permitted on one or more of the bonded data transmission links.

11. The method of claim 1 wherein the second link has a different data transfer characteristic than the first link.

12. The method of claim 1 wherein the second link is a different physical medium than the first link.

13. The method of claim 1 wherein the second link congestion status indicates that the second link is unavailable to accept additional data when a detected fill level in a second FIFO memory provided in the second link exceeds a first watermark of the second FIFO and wherein the second link congestion indicates that the second link is available to accept additional data when the detected fill level in the second is below a second watermark of the second FIFO.

14. A link selection method for bonded data transmission links, comprising:
- detecting a link-to-group backpressure of each of the bonded data transmission links in a bonding group, at least some of the bonded transmission links being of different link types in the bonding group, the link-to-group backpressure of each of the bonded data transmission links being detected based on a link congestion status of each data transmission link that indicates the availability of the bonded transmission link to accept additional data, wherein link congestion status of each data transmission link indicates that the link is unavailable to accept additional data when a detected fill level in a first in first out (FIFO) memory provided in the link exceeds a first watermark of the FIFO and wherein the link congestion status of the link indicates that the link is available to accept additional data when the detected fill level in the FIFO is below a second watermark of the FIFO; and
- selecting one of the bonded data transmission links in the bonding group as a next link to be used for data transmission based on the detected link-to-group backpressures.

15. The method of claim 14 wherein selecting one of the bonded data transmission links in the group as the next link comprises selecting the next non-congested link in a round robin fashion.

16. The method of claim 14 further comprising:
- determining a traffic class of the data to be transmitted; and
- selecting one of the one of the bonded data transmission links in the group as the next link to be used for data transmission based on the detected link-to-group backpressures and the determined traffic class.

17. A computer-readable storage device storing statements and instructions for execution by a processor to perform a link selection method for bonded transmission links, the method comprising:
- determining a link priority for first and second links in a bonding group comprising the bonded data transmission links, the first and second links being of different link types in the bonding group, the determined link priority for first and second links being based on a data transmission reliability of the first and second links, respectively;
- detecting a link-to-group backpressure of the first and second links, the link-to-group backpressure of the first link being detected based on a first link congestion status of the first link and being based on the availability of the first link to accept additional data and the link-to-group backpressure of the second link being detected based on a second link congestion status of the second link that indicates the availability of the second link to accept additional data; and
- selecting one of the first and second links as a next link to be used for data transmission based on the determined link priorities and the detected link-to-group backpressures,
- wherein the first link congestion status indicates that the first link is unavailable to accept additional data when a detected fill level in a first first-in-first-out (FIFO) memory provided in the first link exceeds a first watermark of the first FIFO, and wherein the first link congestion status indicates that the first link is available to accept additional data when the detected fill level in the first FIFO is below a second watermark of the first FIFO.

18. The computer-readable storage device of claim 17 wherein the second link congestion status indicates that the second link is unavailable to accept additional data when a detected fill level in a second FIFO memory provided in the second link exceeds a first watermark of the second FIFO and wherein the second link congestion status indicates that the second link is available to accept additional data when the detected fill level in the second is below a second watermark of the second FIFO.

\* \* \* \* \*